(12) United States Patent
Wiser et al.

(10) Patent No.: US 7,686,869 B2
(45) Date of Patent: Mar. 30, 2010

(54) ACTIVE FIELD POLARIZED MEDIA AIR CLEANER

(75) Inventors: Forwood C Wiser, Kingston, NJ (US); George R Summers, Carleton Place (CA); Benjamin H Kaeppner, Carleton Place (CA)

(73) Assignee: Environmental Management Confederation, Inc., Princeton, NJ (US)

( * ) Notice: Subject to any disclaimer, the term of this patent is extended or adjusted under 35 U.S.C. 154(b) by 334 days.

(21) Appl. No.: 11/617,893

(22) Filed: Dec. 29, 2006

(65) Prior Publication Data

US 2007/0199449 A1 Aug. 30, 2007

Related U.S. Application Data

(60) Provisional application No. 60/754,805, filed on Dec. 29, 2005.

(51) Int. Cl.
*B03C 3/155* (2006.01)

(52) U.S. Cl. .................. 96/66; 55/495; 55/DIG. 31; 96/67; 96/83; 96/99

(58) Field of Classification Search .............. 96/66, 96/67, 69, 83, 84, 96, 99; 55/495, 497, 501, 55/503, 506, DIG. 31
See application file for complete search history.

(56) References Cited

U.S. PATENT DOCUMENTS

| | | | |
|---|---|---|---|
| 2,571,079 A | 10/1951 | Warburton | |
| 2,908,348 A | 10/1959 | Rivers et al. | |
| 3,073,094 A | * 1/1963 | Landgraf et al. | ............... 96/66 |
| 3,471,695 A | 10/1969 | Hudson et al. | |
| 3,509,696 A | * 5/1970 | Thompson | ..................... 96/66 |
| 4,549,887 A | 10/1985 | Joannou | |
| 4,555,252 A | 11/1985 | Eckstein | |
| 4,715,870 A | 12/1987 | Masuda et al. | |
| 4,750,921 A | 6/1988 | Sugita et al. | |
| 4,828,586 A | 5/1989 | Joannou | |
| 4,853,005 A | 8/1989 | Jaisinghani et al. | |
| 4,886,526 A | 12/1989 | Joannou | |
| 4,889,542 A | 12/1989 | Hayes | |
| 4,902,306 A | 2/1990 | Burnett et al. | |
| 4,978,372 A | 12/1990 | Pick | |
| 5,059,218 A | 10/1991 | Pick | |

(Continued)

FOREIGN PATENT DOCUMENTS

CA    1272453    8/1990

(Continued)

*Primary Examiner*—Richard L Chiesa
(74) *Attorney, Agent, or Firm*—Volpe And Koenig, P.C.

(57) ABSTRACT

Improvements in active field polarized media air cleaner include an aerodynamic front cowling to reduce static air resistance, a rear double hinge to reduce blow by, a resistive center screen permitting the sharing of high voltage power supplies while reducing the tendency to arc and allowing for a higher operational voltage, a dielectric media support frame to produce a more uniform electrostatic field and reduce blow by, while at the same time reducing the tendency to spray corona and/or arc at the edges of the center screen, a substantially flat conductive outer screen to produce a more uniform electrostatic field throughout the filter media and a high-voltage shield to reduce high-voltage arcing and the spraying of corona where the high-voltage probe contacts the center screen.

9 Claims, 8 Drawing Sheets

U.S. PATENT DOCUMENTS

| | | | |
|---|---|---|---|
| 5,108,470 A | 4/1992 | Pick | |
| 5,192,342 A | 3/1993 | Baron et al. | |
| 5,240,478 A | 8/1993 | Messina | |
| 5,322,473 A | 6/1994 | Hofstra et al. | |
| 5,330,559 A | 7/1994 | Cheney et al. | |
| 5,330,722 A | 7/1994 | Pick et al. | |
| 5,336,299 A | 8/1994 | Savell | |
| 5,360,469 A | 11/1994 | Baron et al. | |
| 5,417,433 A | 5/1995 | Phillips | |
| 5,441,279 A | 8/1995 | Messina | |
| 5,474,599 A | 12/1995 | Cheney et al. | |
| 5,573,577 A * | 11/1996 | Joannou | 96/66 |
| 5,616,172 A | 4/1997 | Tuckerman et al. | |
| 5,627,376 A | 5/1997 | Jaisinghani et al. | |
| 5,730,770 A | 3/1998 | Greisz | |
| 5,807,425 A * | 9/1998 | Gibbs | 96/66 |
| 5,846,302 A * | 12/1998 | Putro | 96/66 |
| 5,888,274 A | 3/1999 | Frederick | |
| 5,997,619 A | 12/1999 | Knuth et al. | |
| 6,063,167 A | 5/2000 | Rutkowski | |
| 6,077,334 A | 6/2000 | Joannou | |
| 6,099,607 A | 8/2000 | Haslebacher | |
| 6,294,004 B1 | 9/2001 | Summers et al. | |
| 6,428,610 B1 | 8/2002 | Tsai et al. | |
| 6,464,760 B1 | 10/2002 | Sham et al. | |
| 6,491,743 B1 | 12/2002 | Joannou et al. | |
| 6,497,754 B2 | 12/2002 | Joannou | |
| 6,514,324 B1 | 2/2003 | Chapman | |
| 6,544,309 B1 | 4/2003 | Hoefer et al. | |
| 6,547,860 B2 | 4/2003 | Buchwald et al. | |
| 6,572,685 B2 | 6/2003 | Dunshee | |
| 6,723,150 B2 | 4/2004 | Parker | |
| 6,764,533 B2 * | 7/2004 | Lobiondo, Jr. | 96/66 |
| 6,955,708 B1 * | 10/2005 | Julos et al. | 95/59 |
| 6,984,259 B2 | 1/2006 | Hurst | |
| 7,014,688 B2 | 3/2006 | Griffiths et al. | |
| 7,025,806 B2 | 4/2006 | Coppom et al. | |
| 7,112,232 B2 | 9/2006 | Chang et al. | |
| 7,150,780 B2 | 12/2006 | Krichtafovitch et al. | |
| 7,323,146 B2 | 1/2008 | Kim et al. | |
| 7,364,607 B2 | 4/2008 | Ueda et al. | |
| 7,367,997 B1 | 5/2008 | Isogawa | |
| 7,445,654 B2 | 11/2008 | Wong | |
| 7,455,706 B2 | 11/2008 | Latham et al. | |
| 7,459,002 B2 | 12/2008 | Kalous et al. | |
| 2002/0021194 A1 | 2/2002 | Maehara et al. | |
| 2004/0144254 A1 | 7/2004 | Wiser et al. | |
| 2005/0045036 A1 | 3/2005 | Vetter et al. | |
| 2005/0172812 A1 | 8/2005 | Ueda et al. | |
| 2006/0137527 A1 * | 6/2006 | Joannou | 96/66 |
| 2006/0180023 A1 | 8/2006 | Coppom et al. | |

FOREIGN PATENT DOCUMENTS

| | | |
|---|---|---|
| DE | 3339828 | 5/1985 |
| JP | 55-24561 A * | 2/1980 |
| RU | 2240856 | 12/1990 |
| RU | 2026751 | 1/1995 |

* cited by examiner

ACTIVE FIELD POLARIZED MEDIA AIR CLEANER

This application hereby claims priority from U.S. provisional patent application no. 60/754,805, filed Dec. 29, 2005.

FIELD OF INVENTION

The present invention relates generally to air cleaning systems and is particularly directed to air cleaners of the type that use an electrostatic field to polarize a media and to polarize particles to increase the particle collection efficiency on the media.

BACKGROUND OF THE INVENTION

The principal of electrostatic attraction has been used for many years to enhance the removal of contaminants from air streams. There are three primary categories of air electrostatic cleaners: electrostatic precipitators, passive electrostatic filters and active field polarized media air cleaners, which are sometimes known under different terms.

Electrostatic precipitators charge particles and then capture them on oppositely charged and/or grounded collection plates.

A passive electrostatic filter (also know as an electret) employs a media (or combination of different media) that through some combination of treatment and/or inherent properties has an electrostatic charge. Particles entering the filter media that have an electrostatic charge are attracted to the charged media filter materials that have the opposite electrostatic charge.

An active field polarized media air cleaner uses an electrostatic field created by a voltage differential between two electrodes. A dielectric filter media is placed in the electrostatic field between the two electrodes. A dielectric material is an electrical insulator or a substance that is highly resistant to electric current that can also store electrical energy. A dielectric material tends to concentrate an applied electric field within itself and is thus an efficient supporter of electrostatic fields. The electrostatic field polarizes both the media fibers and the particles that enter, thereby increasing the efficiency of the media and the air cleaner. The efficiency of the filter is the percentage of particles removed from the air stream at a given particle size, or for a range of particle sizes.

A further electrostatic air filter design is disclosed in Canadian Patent No. 1,272,453, in which a disposable rectangular cartridge is connected to a high voltage power supply. The cartridge consists of a conductive inner center screen, which is sandwiched between two layers of a dielectric fibrous material (either plastic or glass). The two dielectric layers are, in turn, further sandwiched between two outer screens of conductive material. The conductive inner center screen is raised to a high voltage, thereby creating an electrostatic field between the conductive inner center screen and the two conductive outer screens that are kept at an opposite or ground potential. The high voltage electrostatic field polarizes the fibers of the two dielectric layers.

The air cleaners may be installed in a variety of configurations and situations, both as part of a heating ventilating and air conditioning (HVAC) system and in standalone air moving/cleaning systems. In smaller HVAC systems (e.g. residential and light commercial), the air cleaner panels are often installed in a flat configuration (perpendicular to the airflow) or in angled filter tracks. In larger systems, banks of air filters are typically arranged in a V-bank configuration where multiple separate filters are positioned to form a Z-fold filter perpendicular to the axis of airflow.

SUMMARY OF THE INVENTION

The invention is embodied in improvements to active field polarized media air cleaners.

Aerodynamic Front Cowling

In accordance with one aspect of the present invention, a V-bank configuration of active field polarized media air cleaners includes an aerodynamic front cowling joining front edges of adjacent active field polarized media panel air cleaners facing the airflow. The front cowling provides a lower form drag airflow to reduce filter static pressure drop (resistance to airflow). In addition, the hollow interior of the aerodynamic front cowling provides a recess for concealing the high voltage power supply inside the aerodynamic front cowling, providing protection and insulation of the electrical components. Further, the cowling serves as a wire chase for running both high and low voltage wires between air cleaner panels and adjacent air cleaner modules.

Rear Double Hinge Air Seal

In accordance with another aspect of the present invention, a V-bank configuration of active field polarized media air cleaners includes a rear double hinge joining rear edges of adjacent active field polarized media air cleaners. The rear double hinge provides a positive seal between adjacent active field polarized media air cleaners, thereby reducing blow-by between adjacent active field polarized media air cleaners and increasing efficiency.

Improved Electrode for Polarized Media Air Cleaner

In accordance with another aspect of the present invention, the high voltage electrode is made from a conductive extruded plastic netting or other similar material that provides for significantly higher operational voltages and therefore higher efficiencies.

Resistive Center Screen and Variable High Voltage Power Supply

In accordance with yet another aspect of the present invention, more than one active field polarized media air cleaners may share a single high voltage power supply. In such manner, if one active field polarized media air cleaner shorts out, the resistance of the center screen will limit the current drawn from the high-voltage power supply by the short circuit, thereby permitting the other active field polarized media air cleaner sharing the same power supply to continue operating normally.

Additionally, the high-voltage power supplies may be made variable so that an optimal voltage may be selected that provides an optimum electrostatic field without arcing.

Dielectric Media Support Frame

In accordance with another aspect of the present invention, an active field polarized media air cleaner includes a dielectric media support frame having on one side a recess or shelf for holding the center screen and/or the filter media and on the other side a protrusion for creating a positive seal with the conductive holding frame that holds the conductive outer screens. The dielectric media support frame allows the center screen to extend to the edge of the filter media without shorting or arcing to the conductive outer screens or to the conductive holding frame, an arrangement that provides a more uniform electrostatic field throughout the filter media. The border provided by the dielectric media support frame also prevents the spraying of corona at the edges of the center conductive screen. The positive seal between the dielectric media support frame and the conductive holding frame reduces air leakage (blow-by) between the conductive holding frame and the edge of the filter media. The dielectric media support frame can be made of either rigid or flexible plastic material.

Flat Conductive Outer Screen

For a more uniform distance between electrodes and therefore a more uniform field throughout the active field polarized media air cleaner, the conductive outer screen is made relatively flat as compared to the flexible outer screens of prior art active field polarized media air cleaners. The flatness of the outer screen is achieved by using a relatively rigid material as compared to the dielectric filter material.

Improve High Voltage Contact

One of the problems in prior art active field polarized media air cleaners is the area where the high-voltage probe contacts the center screen. Typically in the prior art, the high voltage connection is made with a probe or clip that contacts the center screen (or electrode) over a relatively small area. In some cases, the contact becomes poor. The problem with this arrangement is that over time, the point of contact can arc, spray and erode the area of contact on the electrode and make less certain contact. As this erosion progresses, it can accelerate to the point where contact is no longer being made. The present invention overcomes this problem and maintains air cleaner integrity by various means making the high voltage contact a large area by means of a disc and/or disc and fastener that spreads the connection over a far wider surface of the electrode. While various embodiments of the invention will show the high-voltage contact area as circular, other shapes would work as well.

Also, there is a tendency to spray corona and/or arc in the region of the high-voltage probe. To reduce spraying and arcing in the region where the high-voltage probe contacts the center screen, a high-voltage probe enclosed in a high voltage shield is provided.

DETAILED DESCRIPTION

Figure 1:
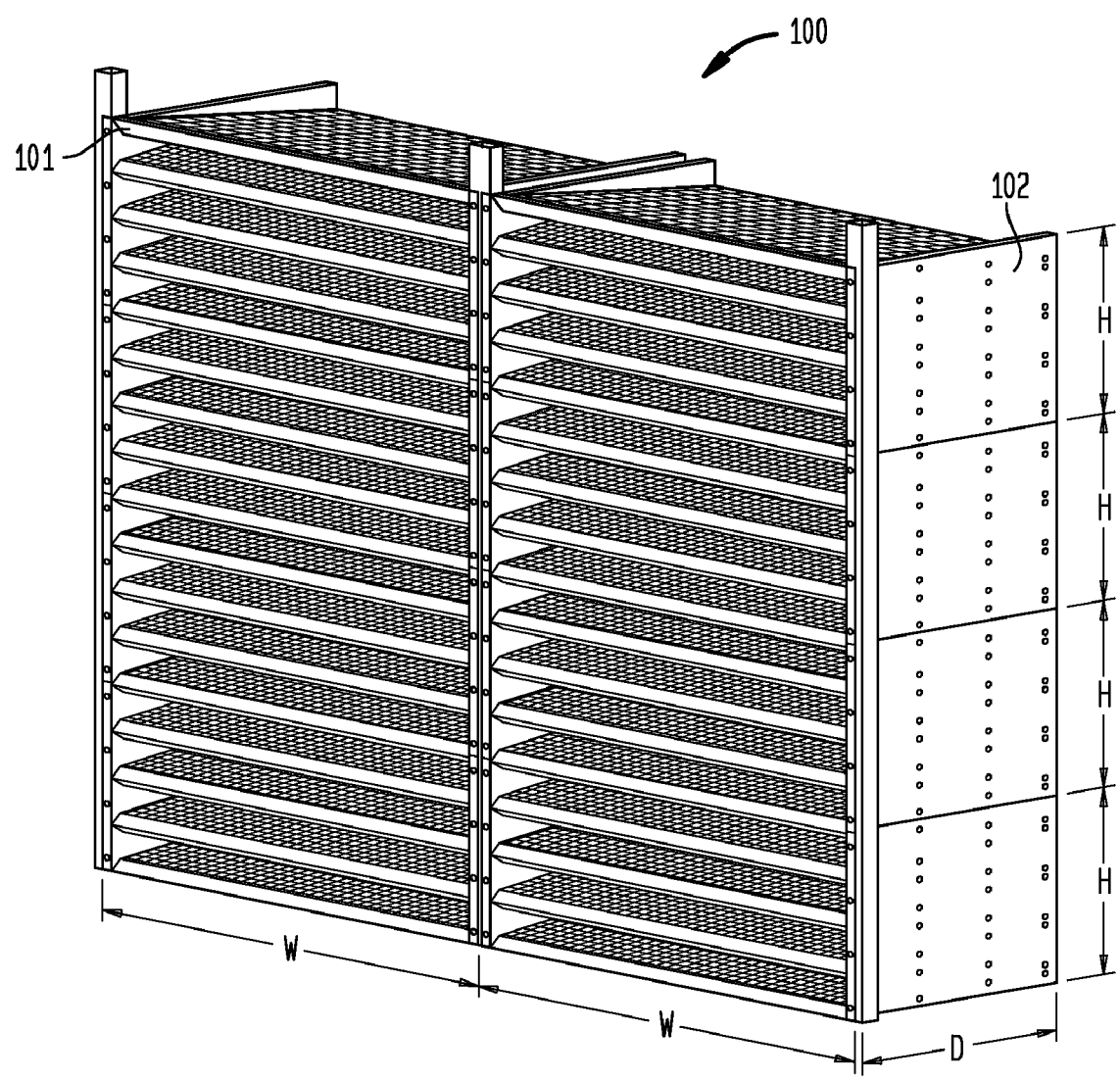
FIG. 1 is an isometric drawing of a plurality of active field polarized media air cleaner panels arranged in a V-bank configuration in accordance with the present invention.

A plurality of active field polarized media air cleaner panels (filters), arranged in a V-bank configuration 100, in accordance with the present invention is shown in FIG. 1. The individual filter panels 101 may be referred to herein as either a "panel", "filter" and/or an "air cleaner." A plurality of active field polarized media air cleaners 101 are organized into a plurality of stackable modules 102 each module having a width W, a height H and a depth D that is variable, depending on the application. In particular, the V-bank 100 in FIG. 1 contains eight stackable modules 102 each of which contains eight individual active field polarized media air cleaners for a total of 64 air cleaners.

Figure 16:
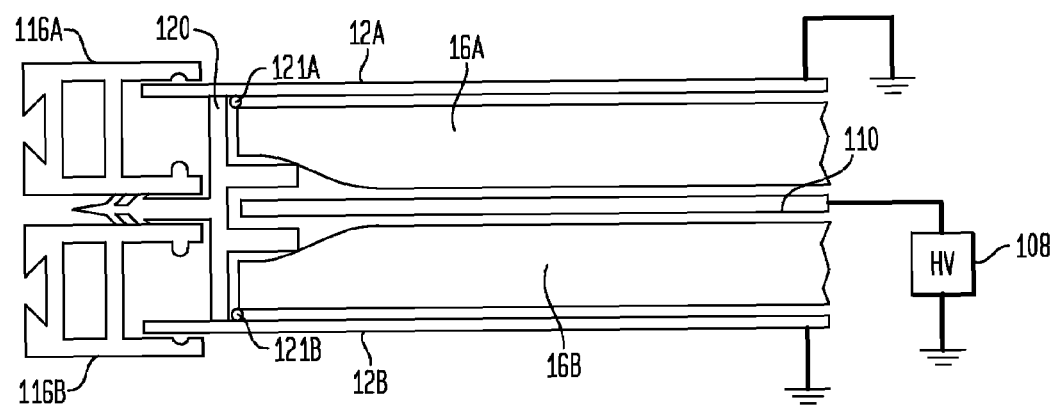
FIG. 16 is an assembly drawing illustrating the use of a dielectric media support frame in accordance with the present invention.

A typical active field polarized media air cleaner is shown in FIG. 16. A first pad of fibrous dielectric material 16A is disposed above a center screen 110. On the other side of the center screen 110 is a second pad of dielectric filter material 16B. The first pad of dielectric filter material is attached to the dielectric media support frame 120 by a suitable means such as adhesive material 121A or ultrasonic welding. Above the first pad of dielectric filter material 16A is a first conductive outer screen 12A. Below the second pad of dielectric filter material 16B is a second conductive outer screen 12B. The second pad of dielectric filter material is attached to the dielectric media support frame 120 by a suitable means, such as adhesive material 121B or ultrasonic welding. The first conductive outer screen 12A is held in place by a first conductive holding frame 116A. The second conductive outer screen 12B is held in place by a second conductive holding frame 116B.

The filter media itself consists of a dielectric media support frame 120, a first pad of fibrous dielectric material 16A, a center screen 110 and second pad of dielectric filter material 16B. The filter holding frame that holds the filter media consists of a first conductive holding frame 116A with a first conductive outer screen 12A, and a second conductive holding frame 116B with a second conductive outer screen 12B.

In operation, one terminal of a high voltage power supply 108 is connected to center screen 110. The other terminal of the high-voltage power supply 108 is coupled to the first conductive outer screen 12A and the second conductive outer screen 12B, which is held typically at ground potential.

Particles in the incoming air passing through dielectric filter material 16A and 16B of the active field polarized media air cleaner of FIG. 16 are polarized by the electric field therein and collected on the first and second pads of dielectric filter material 16A, 16B.

Aerodynamic Front Cowling

Figure 2:
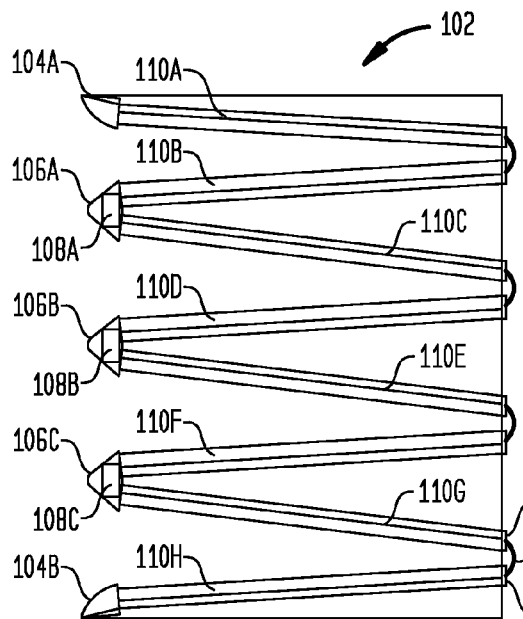
FIG. 2 is a cross-sectional view of a plurality of active field polarized media air cleaner filters arranged in a V-bank configuration in accordance with the present invention.

A cross-sectional view of an individual module 102 from FIG. 1 is shown in FIG. 2. Each of the individual active field polarized media air cleaners 110A, 110B, 110C, 110D, 110E, 110F, 110G and 110H are held in place in a V-bank formation. At the front of the module 102 a plurality of cowlings holds each filter in place. In particular, there are two end cowlings 104A and 104B at the top and bottom of module 102. In between the two end cowlings, there are three middle cowlings 106A, 106B and 106C. The aerodynamic shape of the cowlings provides for a lower form drag airflow thereby reducing the static (air resistance) of the filter.

Figure 6:
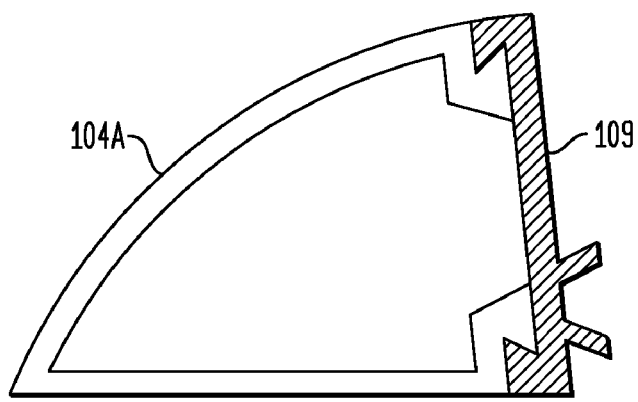
FIG. 6 is a cross-sectional view of a front cowling for use on the top or bottom of a stack of active field polarized media air cleaner filters arranged in a V-bank configuration in accordance with the present invention.
Figure 7:
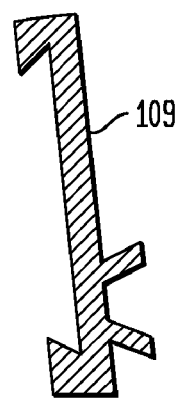
FIG. 7 is a cross-sectional view of a hinge section in accordance with the present invention for use in conjunction with the front cowling a FIG. 6.
Figure 8:
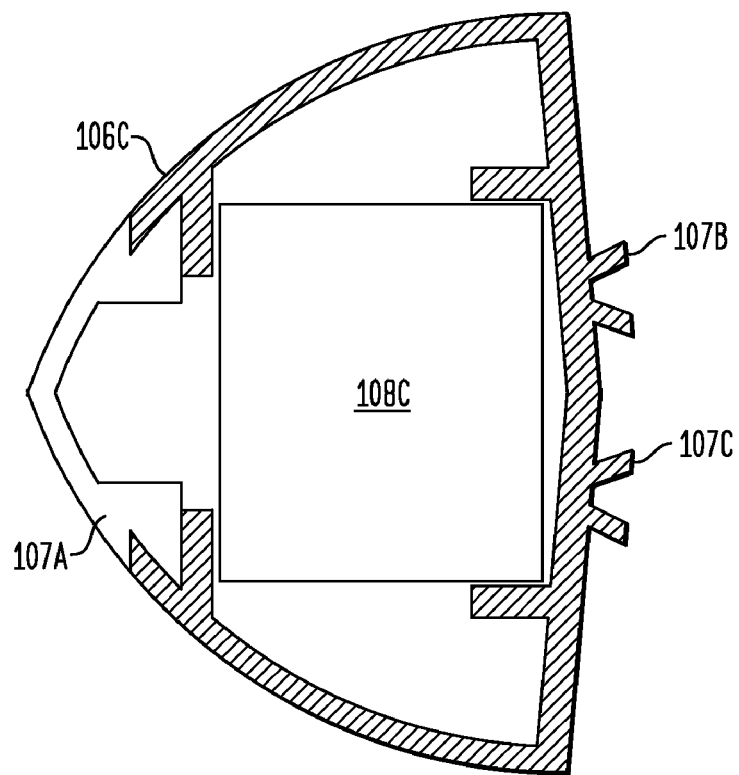
FIG. 8 is a cross-sectional view of a front cowling for use with a plurality of active field polarized media air cleaner filters arranged in a V-bank configuration in accordance with the present invention.

A detailed view of a center cowling 106C is shown in FIG. 8. A removable cap 107A is coupled to the body of the cowling 106C by a dovetail joint. The removable cap permits the insertion of a power supply 108C (not shown to scale). This shields the electronics in the power supply 108C from the air stream and insulates it from grounded surfaces of the outer filter holding frames and system housing. Further, the center cowling 106C provides a chase or tray for both low and high voltage wires to be run between panels or modules. The center cowling 106C includes a first and second attachment points, 107B and 107C. A detailed view of an end cowling 104A is shown in FIG. 6. An end piece 109 (shown in FIG. 7) is coupled to the end cowling 104A by a dovetail joint. In other embodiments of the present invention, the dovetail may be of a variety of shapes such as "L"'s or "T"'s or alternately there may be no mating protrusion and the cowling would be bonded, screwed or otherwise attached to the filter holding frames.

Figure 9:
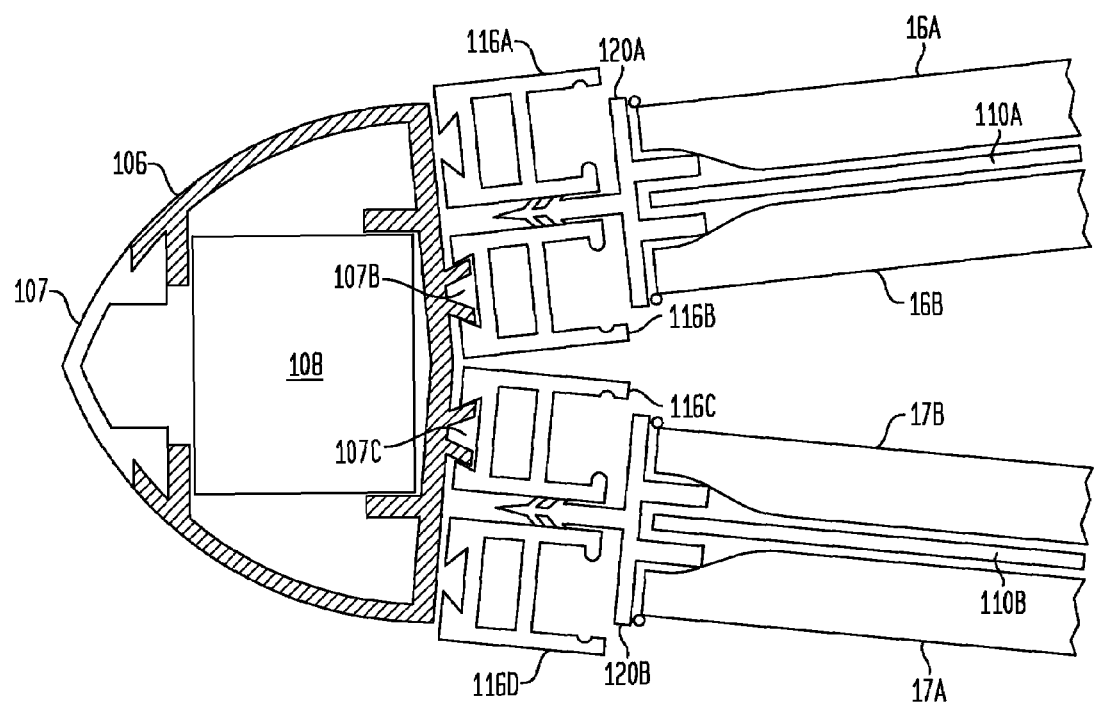
FIG. 9 is an assembly drawing of first and second active field polarized media air cleaners and a front cowling in accordance with the present invention.

A completed assembly of the aerodynamic front cowling coupled to the filter holding frames of two active field polarized media air cleaners is shown in FIG. 9. First and second pads of dielectric filter material 16A 16B and a center screen 110A are coupled to a dielectric media support frame 120A.

The dielectric media support frame 120A is held in place between an upper conductive frame 116A and a lower conductive frame 116B. The lower conductive frame 116B is coupled to the attachment point 107B of the center cowling 106 by a dovetail joint.

Similarly, first and second pads of dielectric filter material 17A, 17B and a center screen 110B are coupled to a dielectric media support frame 120B. The dielectric media support frame 120B is held in place between an upper conductive frame 116C and a lower conductive frame 116D. The upper conductive frame 116C is coupled to the attachment point 107C of the center cowling 106 by a dovetail joint.

The center aerodynamic cowling 106 provides for lower form drag airflow over the two active field polarized media air cleaner panels. Further, it decreases assembly time of the modules.

Rear Double Hinge Air Seal

Figure 3:
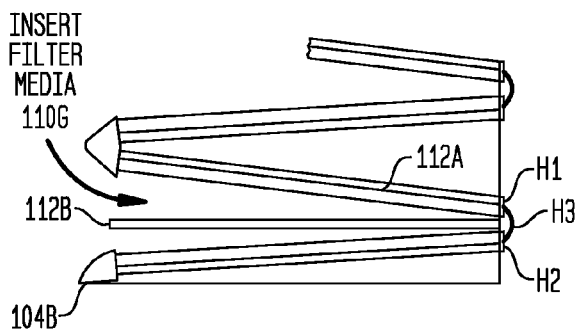
FIG. 3 is a detailed portion of a cross-sectional view of a plurality of active field polarized media air cleaner filters arranged in a V-bank configuration in accordance with the present invention illustrating insertion of replacement filter media into a lower filter holding frame.

At the rear of the module 102 (FIG. 2) a plurality of double hinges holds each filter in place. Each double hinge is comprised of three hinges H1, H2 and H3. As shown in FIG. 3, the first hinge H1 has a first attachment point coupled to an upper frame 112A, and a second attachment point coupled to a lower frame 112B. The hinge H1 has a pivot point that permits the lower frame 112B to rotate away from the upper frame 112A so as to allow a replacement filter media to be inserted into the active field polarized media air cleaner 110G.

Figure 4:
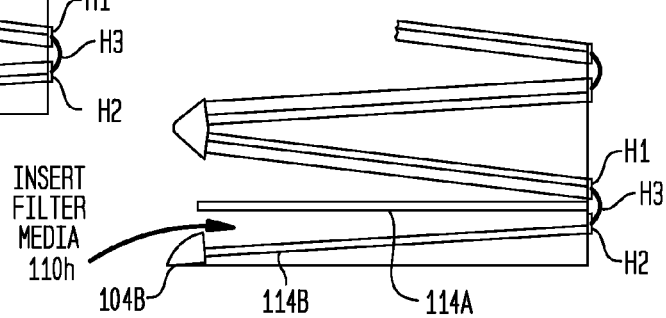
FIG. 4 is a detailed portion of a cross-sectional view of a plurality of active field polarized media air cleaner filters arranged in a V-bank configuration in accordance with the present invention illustrating insertion of replacement filter media into an upper filter holding frame.

Similarly, as shown in FIG. 4, the second hinge H2 has a first attachment point coupled to an upper frame 114A, and a second attachment point coupled to a lower frame 114B. The hinge H2 has a pivot point that permits the upper frame 114A to rotate away from the lower frame 114B so as to allow a replacement filter media to be inserted into the active field polarized media air cleaner 110H.

A third hinge H3 as a first attachment point coupled to the first hinge H1 and a second attachment point coupled to the second hinge H2. The third hinge H3 has a third pivot point such that the upper active field polarized media air cleaner (112A, 112B) can rotate as a unit with respect to the lower active field polarized media air cleaner (114A, 114B). The use of double hinges at the rear of module 102 provides for flexibility in mounting active field polarized media air cleaners at different angles with respect to each other. The double hinge at the rear of the module 102 also provides a good air seal at the rear of the filters regardless of the different angles for mounting individual air cleaners. The positive seal provided by the double hinge at the rear of the filters reduces blow by, i.e. the portion of the air stream passing by the filter arrangement without passing through the filter media.

Figure 10:
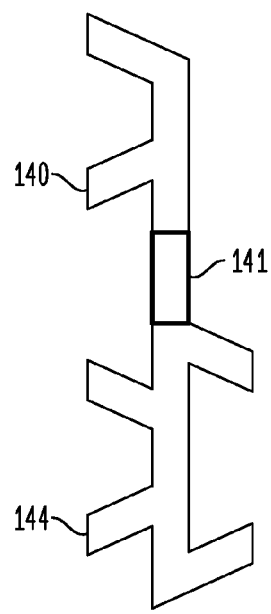
FIG. 10 is a cross-sectional view of a first portion of a double hinge in accordance with the present invention.
Figure 11:
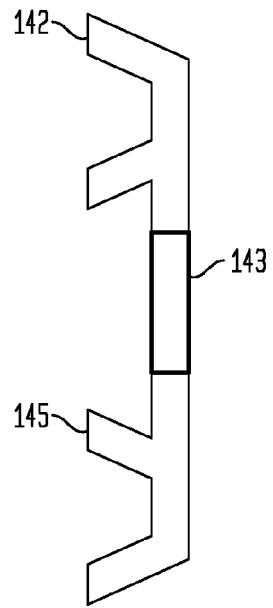
FIG. 11 is a cross-sectional view of a second portion of a double hinge in accordance with the present invention.

The double hinge of the present invention is shown in further detail in FIGS. 10, 11, 12 and 13. Each hinge is formed by a plastic extrusion comprising rigid and flexible plastic regions. In FIG. 10, a first hinge has a first attachment point 140 and a second attachment point 144. The first and second attachment points 140, 144 rotate with respect to each other around a pivot area 144. The attachment points 140, 144 are generally rigid plastic or other material components as compared to the more flexible material, typically plastic, of the pivot area 141. The pivot area 141 is typically made of flexible plastic, which forms a pivot point about which the first and second attachment points 140, 144 may rotate. Other combinations of materials, for example metal and rubber, are also possible.

Figure 13:
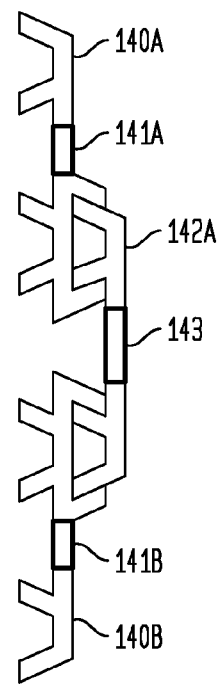
FIG. 13 is an assembly drawing of a double hinge assembly in accordance with the present invention.
Figure 14:
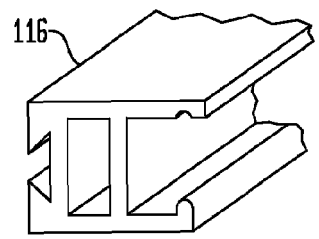
FIG. 14 is an isometric view of a conductive holding frame for use with an active field polarized media air cleaner in accordance with the present invention.

As shown in FIG. 13, two of the hinges of the type shown in FIG. 10 are used in combination with a third hinge to form the double hinge of the present invention. The first of such hinges is shown as 140A having a pivot area 141A. The second of such hinges is shown as 140B having a pivot area 141B. A third hinge 142A in FIG. 13 (also shown in FIG. 11) has a first attachment point 142 and second attachment point 145, which rotate with respect to each other about pivot area 143. The first attachment point of hinge 142A is coupled via a dovetail joint to the first hinge 140A. The second attachment point of hinge 142A is coupled via a dovetail joint to the second hinge 140B. The assembly of the first hinge 140A, the second hinge 140B and the third hinge 142A forms the double hinge of the present invention.

Figure 12:
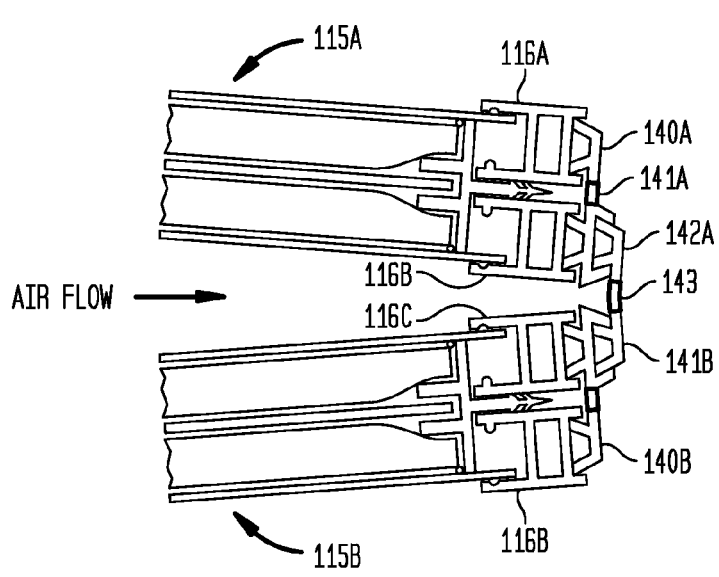
FIG. 12 is an assembly drawing of first and second active field polarized media air cleaners and a double hinge assembly in accordance with the present invention.

FIG. 12 illustrates two active field polarized media air cleaner panels coupled to a double hinge. The upper 116A and lower 116B conductive holding frames of a first filter panel 115A are coupled to the first hinge 140A. In particular, the upper conductive frame 116A of the first filter panel 115A is typically an aluminum extrusion (or other suitable material) having a shape forming a dovetail joint coupled to the first attachment point of the first hinge 140A. The lower conductive frame 116B of the first filter panel 115A is an aluminum extrusion having a shape forming a dovetail joint coupled to the second attachment point of the first hinge 140A. As will be discussed elsewhere, the frames 116A, 116B may also be made of a non-conductive material.

Similarly, the upper conductive frame 116C of the second filter panel 115B is an aluminum extrusion having a shape forming a dovetail joint coupled to the first attachment point of the second hinge 140B. The lower conductive frame 116D of the second filter panel 115B is an aluminum extrusion having a shape forming a dovetail joint coupled to the second attachment point of the second hinge 140B.

Thus, the upper conductive frame 116A and the lower conductive frame 116B of the first filter panel 115A may rotate with respect to each other about pivot point 141A of the first hinge 140A. Similarly, the upper conductive frame 116C and the lower conductive frame 116D of the second filter panel 115B may rotate with respect to each other about pivot point 141B of the second hinge 140B. Finally, by use of the double hinge of the present invention, the first filter panel 115A and the second filter panel 115B may rotate with respect to each other about pivot point 143 of the third hinge 142A.

Alternatively, the outer frame members 116A, 116B, 116C, 116D may be constructed of tubing or "L"'s that are formed, welded, or otherwise constructed into a substantially rectangular frame. The external screens (12A, 12B in FIG. 16) could then be screwed, welded, or otherwise secured to the frame members. Similarly the hinge and cowling assemblies could instead of dovetail joints, be screwed, bonded, or otherwise secured to the sides of the frame. Further, the "dovetail" as disclosed above could be a "T" or "L" or other shape that would provide a positive attachment between the frame member and the hinge in the front or the cowling in the rear.

Improve Electrode Design

While various air permeable materials and grids are described in the prior art (e.g., for use as the center screen), extruded plastic netting is not disclosed. Extruded plastic nettings are made from a wide variety of materials, with either low or high-density polyethylene, being among the most common. The extruded plastic netting is typically made conductive by adding carbon or other agents to the plastic resins. The resulting conductivity is variable and controllable depending on the specific formula used. Fire retardants are also used to make the material suitable for use as a center screen electrode in active field polarized air filtration applications. Extruded plastic netting material has been found to have many advantages from manufacturing and operational standpoints for use as an electrode in an active field polarized media air cleaner. The primary advantages of extruded plastic netting derive from the shape and form of the members of the netting (particularly the lack of sharp edge shapes formed around the openings of the netting).

When using high voltage potentials between electrodes, a number of factors contribute to the propensity for arcing, spraying and corona discharge and the point at which it occurs. The important factors include the shape, consistency, flatness, and spacing of the members or fibers of the electrodes. Sharp edges, burrs, kinks, stray fuzz or fibers, points, etc. all promote spraying and corona discharge. Because of its fabrication process, extruded plastic netting is substantially free of these defects. The resultant center screen grid therefore allows for maximum operational voltages and therefore higher field strengths and greater filter efficiencies. Specifically, it has been found that a center screen made from an extruded plastic netting can carry an operational voltage 20-30% higher than a carbon impregnated foam and up to 40% higher than an aluminum screen. Although a low-density polyethylene is an excellent material for this application, as it lies substantially flat, other materials substantially lacking in sharp features such as sharp edges, burrs, kinks, stray fuzz or fibers, points, etc. will also be appropriate.

Resistive Center Screen and Variable High Voltage Power Supply

The aerodynamic cowlings shown in FIG. 2 are hollow, and, in each middle cowling 106A, 106B and 106C there is a respective high-voltage power supply 108A, 108B and 108C. The three high voltage power supplies 108A, 108B and 108C are shared among the eight active field polarized media air cleaners 110A, 110B, 110C, 110D, 110E, 110F, 110G and 110H. See FIG. 5. It should be noted that there could be one power supply for several or all panels in a module or all modules in an HVAC system or one power supply per panel. The goal is a balance between operational redundancy and overall system cost. Therefore, the present arrangement provides for two or more panels to share a single power supply without one panel being able to adversely impact the operation of the other panels sharing the same power supply.

Figure 5:
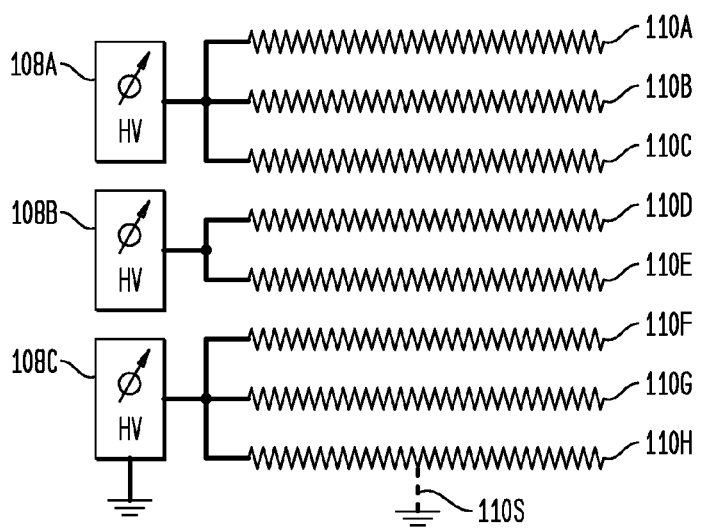
FIG. 5 is a schematic diagram of a plurality of active field polarized media air cleaner filters having resistive center screens and sharing common high-voltage power supplies in accordance with the present invention.

In accordance with one aspect of the present invention, the center screen of each active field polarized media air cleaner is resistive rather than conductive. As shown in FIG. 5, the eight active field polarized media air cleaners 110A, 110B, 110C, 110D, 110E, 110F, 110G and 110H are represented by the symbols for a resistor. In particular, high-voltage power supply 108A is coupled to the center screen for the three active field polarized media air cleaners 110A, 110B and 110C. High-voltage power supply 108B is coupled to the center screen for the two active field polarized media air cleaners 110D and 110E. Finally, high-voltage power supply 108C is coupled to the center screen for the three active field polarized media and cleaners 110F, 110G and 110H.

The shared high-voltage power supply in combination with a resistive center screen and active field polarized media air cleaner permits the filters to still continue to operate in the event that the center screen of one of the air cleaners is shorted to ground. For example, if the center screen of filter 110H were shorted to ground (as illustrated by short circuit 110S) the remaining resistance of the portion of the center screen between the short 110S and high-voltage power supply, would permit high-voltage power supply 108C to continue operating. Thus, even if the center screen of filter 110H has been shorted to ground, the other filters connected to the same power supply (namely 110F and 110G) would continue to operate.

If, as in the prior art, the center screen was highly conductive, then a short circuit of one of the center screens would result in the collapse of the voltage from the high-voltage power supply thereby disabling all of the filters connected to the same high-voltage power supply. To avoid a short circuit in the center screen of one filter from disabling other filters, prior art banks of filters provided for one power supply per filter. The resistive center electrode (screen) could be made of a variety of materials. For example, an extruded plastic net or carbon impregnated foam or mesh. In a further embodiment of the invention the center screen would have odor-absorbing properties, such as a carbon impregnated foam or mesh.

Furthermore, high-voltage power supplies 108A, 108B and 108C are made variable. That is, the output voltage provided by power supply 108A to the center screens of active field polarized media air cleaners 110A, 110B and 110C is adjustable. Similarly, the output voltage provided by power supply 108B to the center screens of active field polarized media air cleaners 110D and 110E is adjustable. In similar manner the output voltage provided by power supply 108C to the center screens of active field polarized media air cleaners 110F, 110G and 110H is adjustable.

Adjustability of the high-voltage potential applied to the center screens of the active field polarized media air cleaners permits an optimization of electrostatic field strength. Generally speaking, the highest possible voltage before arcing occurs is the most desirable choice. However, the highest possible voltage is dependent on several factors such as altitude and humidity. A higher voltage level is desirable where the filters are installed at a sea level location. Conversely, at higher altitude a lower voltage is desirable. The optimum voltage is also related to humidity. In dryer climates, a higher voltage may be applied to the filters without arcing. In climates experiencing higher humidity conditions a lower voltage to prevent arcing is desirable. The adjustability of high-voltage power supplies 108A, 108B and 108C permits the selection of an optimal electrostatic field under appropriate altitude and climate conditions. Further, the arcing voltage will be a function of the materials of both the charged electrode and the media. Variability of the power supply allows for the optimization of the voltage depending on the materials used as well.

Dielectric Media Support Frame

Figure 18:
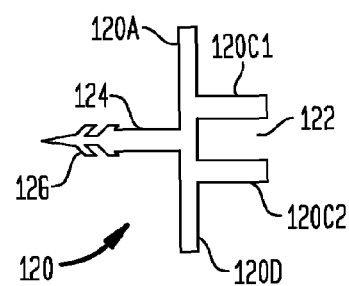
FIG. 18 is a cross-sectional view of a dielectric media support frame in accordance with the present invention.

A cross-sectional view of a dielectric media support frame 120 in accordance with the present invention is shown in FIG. 18. The dielectric media support frame, which is typically formed by extrusion, includes vertical flanges 120A and 120D. The dielectric media support frame 120 also includes horizontal flanges or shelves 120C1 and 120C2. The horizontal flanges or shelves 120C1 and 120C2 form a recess 122. Opposite the recess 122 is a protrusion 124 having flexible fins 126 on both sides.

FIG. 16 illustrates the use of the dielectric media support frame of the present invention in an active field polarized media air cleaner. A first function of the dielectric media support frame 120 is to permit the center screen 110 of an active field polarized media air cleaner to extend all the way to the edge of the filter media. Another function of the dielectric media support frame 120 is to prevent arcing to the upper or lower conductive holding frames 116A, 116B and reduce the spraying of corona at the edges of the center conductive screen 110. To accomplish these functions, the center screen 110 is held in place on one of the shelves 120C1, 120C2 forming the recess 122 of the dielectric media support frame 120.

Figure 22:
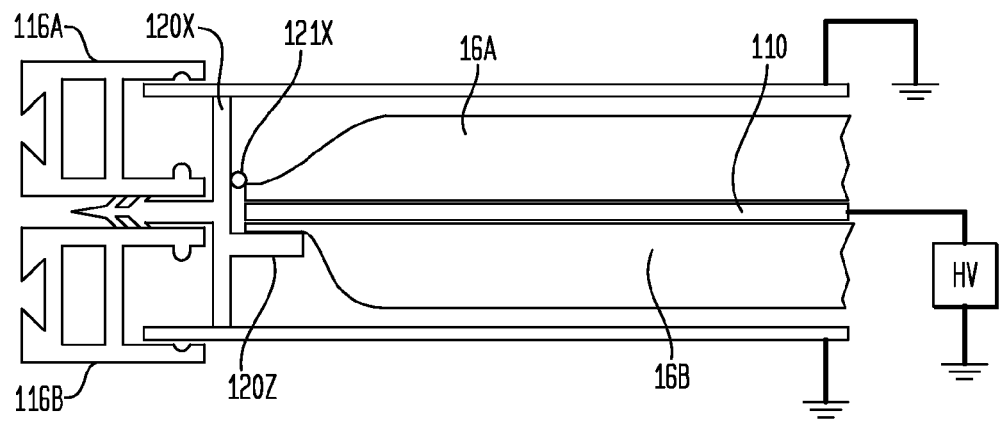
FIG. 22 is an assembly drawing illustrating the use of a dielectric media support frame in accordance with a second embodiment of the present invention.

An alternate embodiment of a dielectric media support frame 120X in accordance with the present invention is shown in FIG. 22. In lieu of a recess, the dielectric media support frame 120X has a single horizontal flange or shelf 120Z. The first pad of dielectric filter material 16A, the center screen 110 and the second pad of dielectric filter material 16B rest on shelf 120Z. The first pad of dielectric filter material is attached to the dielectric media support frame 120 by a suitable means such as adhesive material 121X or ultrasonic welding.

Figure 23:
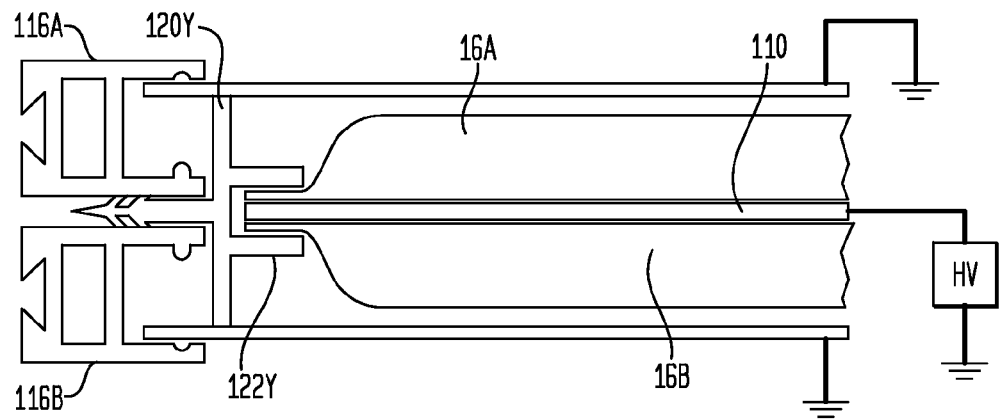
FIG. 23 is an assembly drawing illustrating the use of a dielectric media support frame in accordance with a third embodiment of the present invention.

Yet another alternate embodiment of a dielectric media support frame 120Y in accordance with the present invention is shown in FIG. 23. In FIG. 23 the use of adhesive material (121A and 121B in FIG. 16, or 121X in FIG. 22) is eliminated. The recess 122Y is made large enough so that the first pad of dielectric filter material 16A, the center screen 110 and the second pad of dielectric filter material 16B are positioned in the recess 122Y of the dielectric media support frame 120Y.

Alternatively, the insulating/conductive properties of the dielectric media support frame (120 in FIG. 16) and the upper and lower conductive holding frames (116A, 116B in FIG. 16) could be reversed. That is, the media support frame 120 could be conductive (or not a complete insulator) and the upper and lower holding frames 116A, 116B could be an insulator (i.e. a dielectric or non-conductive material) or be insulated by having a holding clip wrap around the mating surfaces of the holding frames or by having an insulating material applied to them. In the latter case, the media support frame 120 may be omitted with the center screen 110 sandwiched between upper 116A and lower 116B non-conducting and/or insulated holding frames.

A second function of the dielectric media support frame is to form a positive seal between the upper conductive holding frame 116A and the lower conductive holding frame 116B. For the latter purpose, the protrusion 124 and flexible fins 126 of the dielectric media support frame form a positive seal between the upper conductive holding frame 116A and the lower conductive holding frame 116B. Alternatively, the protrusion from the dielectric media support frame could press against the upper conductive holding frame 116A and/or the lower conductive holding frame 116B rather than being pressed between the upper and lower conductive holding frames 116A, 116B. In general, protrusion 124 is any shape that creates a positive seal between the media support frame 120 and the holding frame(s) 116A, 116B.

Flat Conductive Outer Screen

Figure 15:
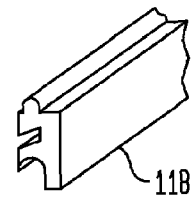
FIG. 15 is an isometric view of a retaining clip or elongated spline for use in conjunction an active field polarized media air cleaners in accordance with the present invention.
Figure 17:
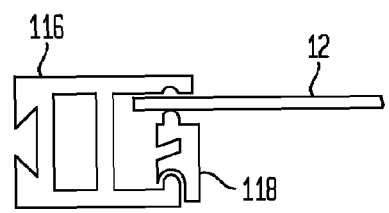
FIG. 17 is a cross-sectional view of an assembly illustrating the use of a retaining clip or elongated spline to hold an conductive outer screen in a conductive holding frame for use in conjunction with the present invention.

A first conductive outer screen 12A is held in place by the upper conductive frame 116A. A second conductive outer screen 12B is held in place by the lower conductive frame 116B. For the sake of clarity, the retaining clips (118 in FIGS. 15 and 17) that hold the outer screens 12A and 12B to upper and lower conductive frames 116A and 116B respectively are omitted in FIG. 16. A cross-sectional view of the retaining clip 118 is illustrated in FIG. 15. A detail view of how the retaining clip 118 is assembled with the conductive frame 116 is shown in FIG. 17. First, the conductive outer screen 12 is inserted into the recess of the conductive holding frame 116. Thereafter, the retaining clip 118 is rotated into place. The retaining clip 118 holds the conductive outer screen 12 in the conductive holding frame 116. The retaining clip 118 is an elongated spline that runs the entire length of the frame.

The conductive outer screen 12 (in FIG. 17) is made of a sufficiently rigid material so as to lie substantially flat when placed against the pad of fibrous dielectric material (16A or 16B in FIG. 16). The conductive outer screen 12 permits air to flow through it. The conductive outer screen 12 may be made of perforated solid sheet material or of expanded sheet material, for example expanded metal. Expanded metal is sheet material that is slit and pulled apart so that the slits stretch open to form passageways for airflow.

The conductive outer screen 12A, 12B being relatively rigid compared to the pad of fibrous dielectric material 16A, 16B, compresses the dielectric material preventing a bowing or "pillow" effect. Thus, when the conductive holding screens 116A and 116B are closed around the pads of dielectric filter material 16A and 16B, the conductive outer screens 12A and 12B are substantially flat and substantially parallel to each other.

Substantially flat conductive outer screens 12A, 12B provides for a more uniform field throughout the active field polarized media air cleaner. In the prior art, the outer screen flexes into a pillow shape, in which case the maximum high-voltage is limited by the minimum spacing (typically near the edges). In the prior art, most of the screen area in the middle of the active field polarized media air filter will be much further away from the center screen (as compared to the area near the edges) thus reducing the electrostatic field which in turn reduces the efficiency of the filter. As compared to the prior art, the electrostatic field of the present invention will be more uniform throughout the filter media and can be sustained at a higher voltage and therefore support a greater electrostatic field.

Improved High Voltage Contact with Center Screen

As indicated in FIG. 16, a first terminal of a high-voltage power supply 108 is coupled to the center screen 110. In the prior art, a high-voltage probe would pass through the conductive outer screen, piercing the pad of fibrous dielectric material 16A or sliding between the two pads 16A and B to make contact by pressing against the center screen 110. Often, such contacts were unreliable. If the high-voltage probe failed to make contact with the center screen, then there would be no electrostatic field across the pads of dielectric filter material 16A, 16B greatly reducing the filter efficiency. Furthermore, the sharp point of a high-voltage probe often resulted in the spraying of corona and/or arcing to the conductive outer screens 12A, 12B. Further, because the center screen material is typically sparse and air permeable and because the contact area was relatively small, arcing could lead to an erosion of the center screen and a loss of contact.

In accordance with the present invention, a conductive disc is attached to the center screen in the area where the high voltage probe would make contact. See FIG. 19. Adding a contact area to the center screen allows for the use of a more resilient material and further, increase the area of contact with the charged electrode (center screen).

When a relatively sparse filter media material is used, a piercing or penetrating high-voltage probe may be employed, and the disc(s) would be on either side of the center screen. However, with denser filter media, it is preferable to have one conductive disc press against the denser filter media and another conductive disc press against the center screen. The two conductive discs would be mechanically an electrically connected to each other.

Figure 19:
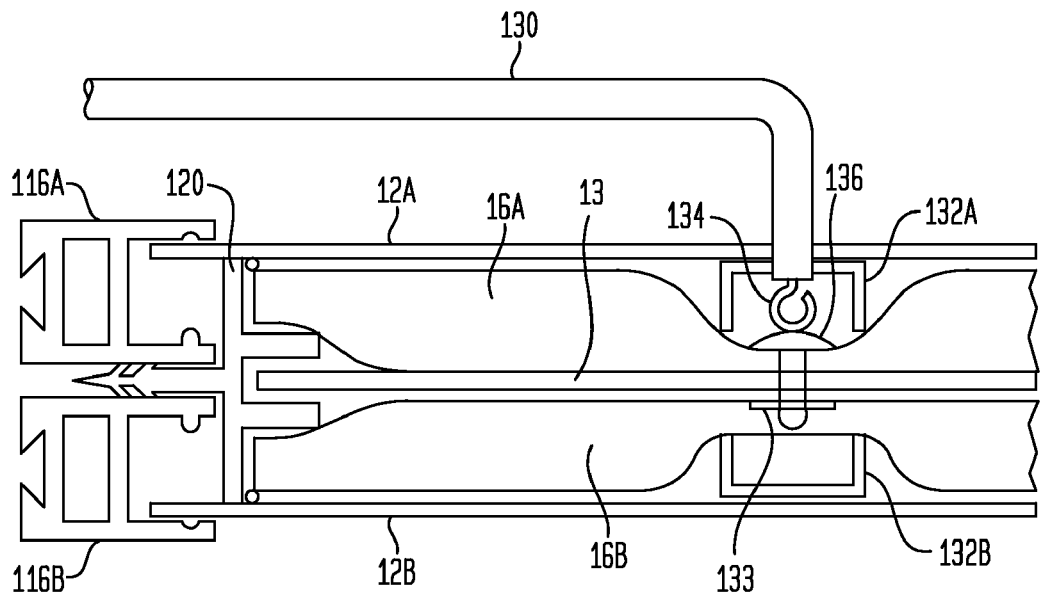
FIG. 19 is an assembly drawing showing a high-voltage probe and high-voltage contact screen in accordance with the present invention.

In accordance with the present invention, a high-voltage contact protected by a high-voltage shield to reliably contact the center screen is shown in FIG. 19. A rivet 136 is passed through a hole in the center screen 13. A conductive disk (e.g. titanium) 133 secures the rivet 136 to the center screen 13, which provides a good connection between the rivet 136 and the charged electrode or center screen 13. Alternatively, a second metallic disk can be placed beneath the head of the rivet.

In a further embodiment of the invention, a high-voltage probe 130 passes through the conductive outer screen 12A and terminates in a high-voltage contact 134. A high-voltage shield of insulating dielectric material 132A surrounds the high-voltage contact 134. Similarly, a high-voltage shield of insulating dielectric material 132B surrounds lower end of the rivet 136 and the metallic disk 133. Alternatively, the high-voltage probe may be routed on the inside of the conductive outer screens 116A, 116B.

Figure 20:
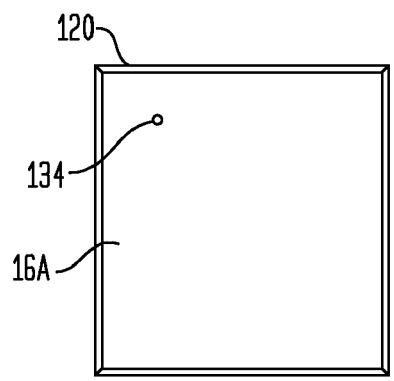
FIG. 20 illustrates the use of the dielectric media support frame in accordance with the present invention.

A top view of the filter media in FIG. 19 is shown in FIG. 20. A dielectric media support frame 120 surrounds the pad of dielectric filter material 16A. The rivet or attachment means 136 passes through the pad of dielectric filter material 16A.

Figure 21:
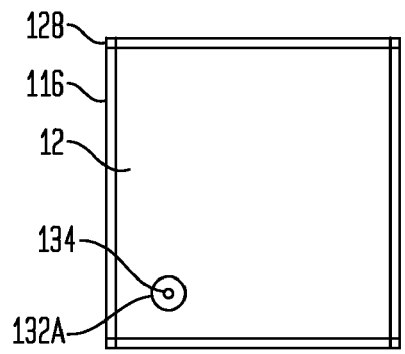
FIG. 21 illustrates the rigid conductive outer screen and conductive holding frame including a high-voltage probe and high-voltage contact shield in accordance with the present invention.

A top view of the frame that holds the filter media in FIG. 19 is shown in FIG. 21. Four conductive outer filter holding frame pieces 116 and four plastic end caps 128 form a frame to hold the conductive outer screen 12. The high-voltage contact 134 is positioned within the insulating high-voltage shield 132A.

In operation, when the conductive outer filter holding frames 116A and 116B (FIG. 19) are closed around the filter media (120, 16A, 13 and 16B) the high-voltage contact 134 contacts the head of the rivet 136. Also, the high-voltage shields 132A and 132B slightly compress the pads of dielectric filter material 16A and 16B. The high-voltage contact 134 assures a reliable connection with the head of the rivet 136. The insulating high-voltage shields 132A, 132B reduce the spraying of corona from the tip of the high-voltage contact 134. Furthermore, the insulating high-voltage shields 132A, 132B reduce the chances of arcing from the high-voltage contact 134 to the conductive outer screens 12A and 12B.

The high-voltage contact 134 is typically made of rigid titanium or other resilient material. In making contact with the head of the rivet 136, the center screen 13 may flex slightly. Alternatively, the high-voltage contact 134 can be a spring contact to reduce the flexing of the center screen 13. Alternative arrangements for the contact area 136 on the center screen 13 include a conductive disk on the top side of the center screen 13, a pair of conductive discs, one on the top and the other on the bottom of the center screen, with a fastener passing through the center screen and holding the two discs together. The key point is that the rigidity of the high-voltage probe 134 or the rigidity of the external conductive outer screens or both in conjunction force a positive mechanical contact between the end of the high-voltage probe 134 and the disc or disc/rivet combination 136. The result is a firm contact that cannot be compromised by vibration, or media movement or center screen (electrode) movement.

What is claimed is:

1. A filter media comprising:

a first pad of dielectric filter material;

a second pad of dielectric filter material being substantially the same shape and area as said first pad of fibrous dielectric material;

a center screen disposed between said first and second pads of dielectric material, said center screen being substantially the same shape and area as said first and second pads of dielectric material; and a dielectric media support frame having an inner side and outer side, said inner side enclosing said first and second pads of dielectric material, the dielectric media support frame having on the inner side thereof a shelf for holding said center screen between said first and second pads of dielectric material;

wherein said dielectric media support frame further comprises a protrusion on the outer side thereof.

2. A filter media in accordance with claim 1, wherein said dielectric media support frame further comprises flexible fins extending from said protrusion.

3. A filter media in accordance with claim 1, for use in an active field polarized media air cleaner, said active field polarized media air cleaner further comprising:

a first conductive outer screen; a first conductive holding frame for holding said first conductive outer screen; a second conductive outer screen;

a second conductive holding frame for holding said second conductive outer screen;

said first and second holding frames being disposed substantially parallel to each other on either side of said dielectric media support frame, whereby said protrusion on the outer side of said dielectric media support frame is substantially in contact with and held between said first and second conductive holding frames.

4. The filter media in accordance with claim 3, wherein the second conductive outer screen comprises a high-voltage probe passing through said conductive outer screen; and an insulating shield attached to said first conductive outer screen, said insulating shield surrounding said high-voltage probe.

5. The filter media in accordance with claim 4, wherein said high-voltage probe comprises a spring contact.

6. The filter media in accordance with claim 4, further comprising a contact attached to said center screen, said contact positioned so as to contact said high-voltage probe.

7. The filter media in accordance with claim 6, wherein said contact comprises: a fastener having a head and a shank, said shank passing through said center screen, said head of said fastener being in contact with said high-voltage probe.

8. The filter media in accordance with claim 7, further comprising a metallic disk disposed on the shank of said fastener, said metallic disk being in contact with said center screen.

9. The filter media in accordance with claim 4, further comprising a second insulating shield attached to said second conductive outer screen, said second insulating shield disposed opposite said first insulating shield.

* * * * *